United States Patent [19]

Falk

[11] 4,130,257
[45] Dec. 19, 1978

[54] TAPE DRIVE MECHANISM

[75] Inventor: Gerhard Falk, Rossdorf, Germany

[73] Assignee: Robert Bosch GmbH, Darmstadt, Germany

[21] Appl. No.: 778,924

[22] Filed: Mar. 18, 1977

[30] Foreign Application Priority Data

Mar. 19, 1976 [DE] Fed. Rep. of Germany ....... 2611638

[51] Int. Cl.² .................................... G11B 15/22
[52] U.S. Cl. ................................ 242/193; 242/204
[58] Field of Search ............... 242/193, 194, 198, 204; 360/93, 96; 352/154

[56] References Cited

U.S. PATENT DOCUMENTS

| 2,732,144 | 1/1956 | Jones ........................... 242/193 |
| 2,868,470 | 1/1959 | Selsted ......................... 242/204 |
| 2,911,162 | 11/1959 | Kyle, Jr. ..................... 242/204 X |
| 3,059,871 | 10/1962 | Loewe .......................... 242/198 |
| 3,173,623 | 3/1965 | Schoebel ....................... 242/194 |
| 3,561,699 | 2/1971 | Garrett ......................... 242/193 |
| 3,664,609 | 5/1972 | McMillin, Jr. ................. 242/204 |

FOREIGN PATENT DOCUMENTS 310294  7/1971  U.S.S.R. .................................. 242/204

Primary Examiner—George F. Mautz
Attorney, Agent, or Firm—Ernest F. Marmorek

[57] ABSTRACT

A tape drive has two hubs which can each be rotated in forward and reverse direction. An arrangement is provided which permits each hub to be freely rotated in one direction while braking the other against rotation in the same direction, and vice versa.

2 Claims, 2 Drawing Figures

TAPE DRIVE MECHANISM

BACKGROUND OF THE INVENTION

This invention relates to a tape drive for a magnetic tape machine with two tape reels which, depending on the transporting direction of the tape, act as take-up reel or as storage reel, the tape travelling from one to the other of these reels.

Such an arrangement is proposed in German Offenlegungsschrift (OS) 17 74 393. It is intended for use in a portable tape recorder and is to prevent the formation of loose tape loops during transportation of the switched-off instrument. A tension-sensitive locking device is provided for this purpose, which allows rotation of the storage-reel in the forward direction only when a predetermined tape tension exists. A unilaterally acting locking device is provided at the driving arrangement for the take-up reel, which permits a rotation of the take-up reel only in the forward direction.

The previously proposed mechanism retains the magnetic tape at a certain minimum tension when the machine is switched off, and also prevents the formation of tape-loops. However, it does not permit rewinding of completely or partially recorded tape, owing to the use of free-wheel clutches between the driving shaft of the take-up reel and the stationary components of the instrument; these clutches permit of only one direction of rotation for the drive shaft.

Rewinding is, however, required in portable magnetic tape recorders which are used for reporting purposes, and is necessary for the seamless joining of individual image scenes in the case of video tape. Moreover, the locking device in the previously proposed tape drive mechanism is complicated, both from the viewpoint of manufacturing costs and the susceptibility to trouble.

SUMMARY OF THE INVENTION

It is therefore the object of the invention to provide a tape drive mechanism for a magnetic tape machine, which in the switched-off state, reliably prevents the formation of tape loops due to the vibrations and changes in position of the machine.

Another object is to allow the tape transport to take place in both the forward and reverse mode in an unrestricted manner and to finally provide a machine which is simple from the viewpoint of construction and mode of operation for the attainment of as great an operating reliability as possible.

This problem is solved with the present invention which provides the drive with two hubs from tape reels, each hub being rotatable in two opposite directions. Means are provided which permit one hub to rotate freely in one direction while braking the other hub against rotation in the same direction, and vice versa. Advantageously, these means may comprise hairpin springs.

The use of hairpin springs as free-wheel clutches in drive mechanisms of tape instruments has been proposed in German Auslegeschrift (AS) 11 74 529 for the selective coupling or uncoupling of a clutch spindle with a driving pulley, depending on the direction of rotation of the pulley. Moreover, this arrangement is not capable of preventing the formation of tape loops. A similar drive arrangement has been proposed in German Auslegeschrift (AS) 11 92 419. It, also, can not prevent damage to the tape as a result of too much slack.

Details of the invention will become apparent from the appended drawing which shows an exemplary embodiment.

DESCRIPTION OF A PREFERRED EMBODIMENT

Figure 1:
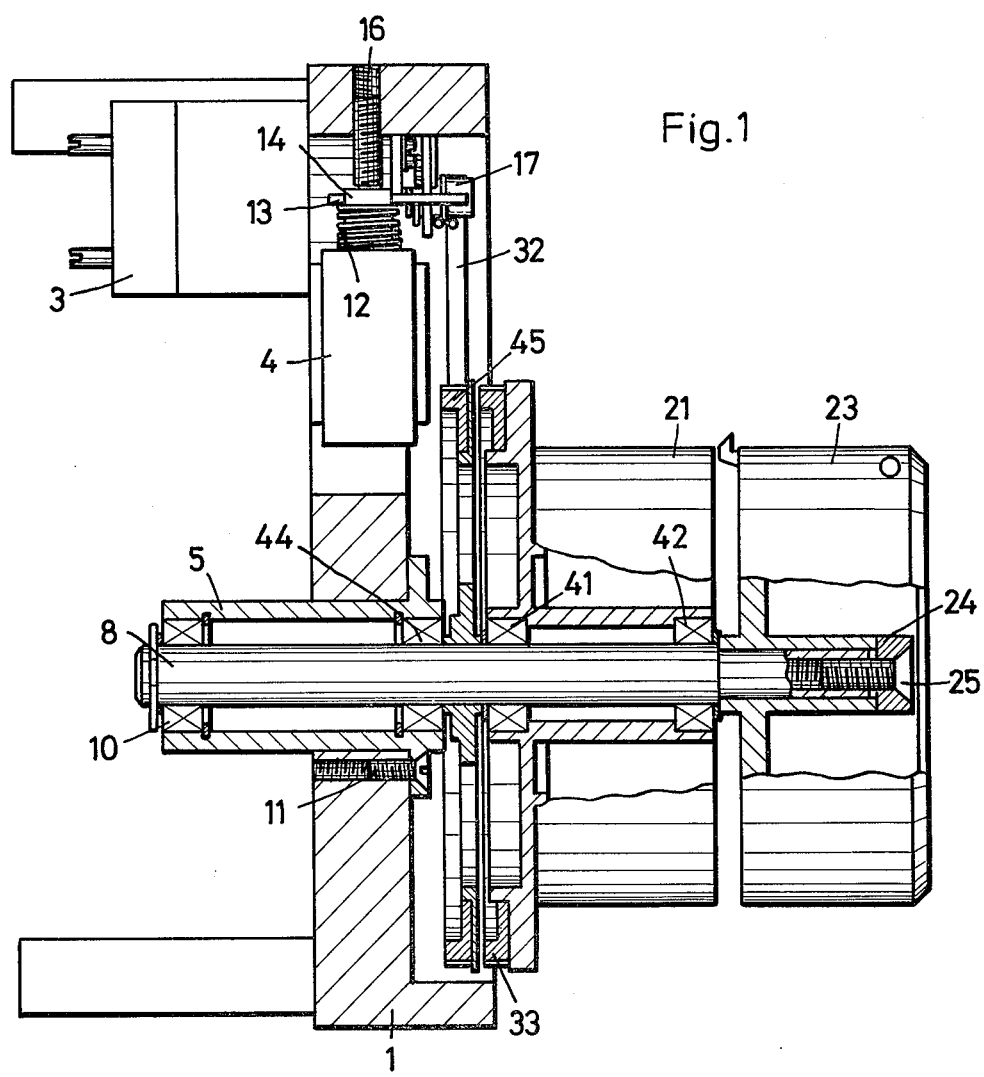
FIG. 1 shows a tape drive mechanism according to the invention, in a partially sectioned side-view.
Figure 2:
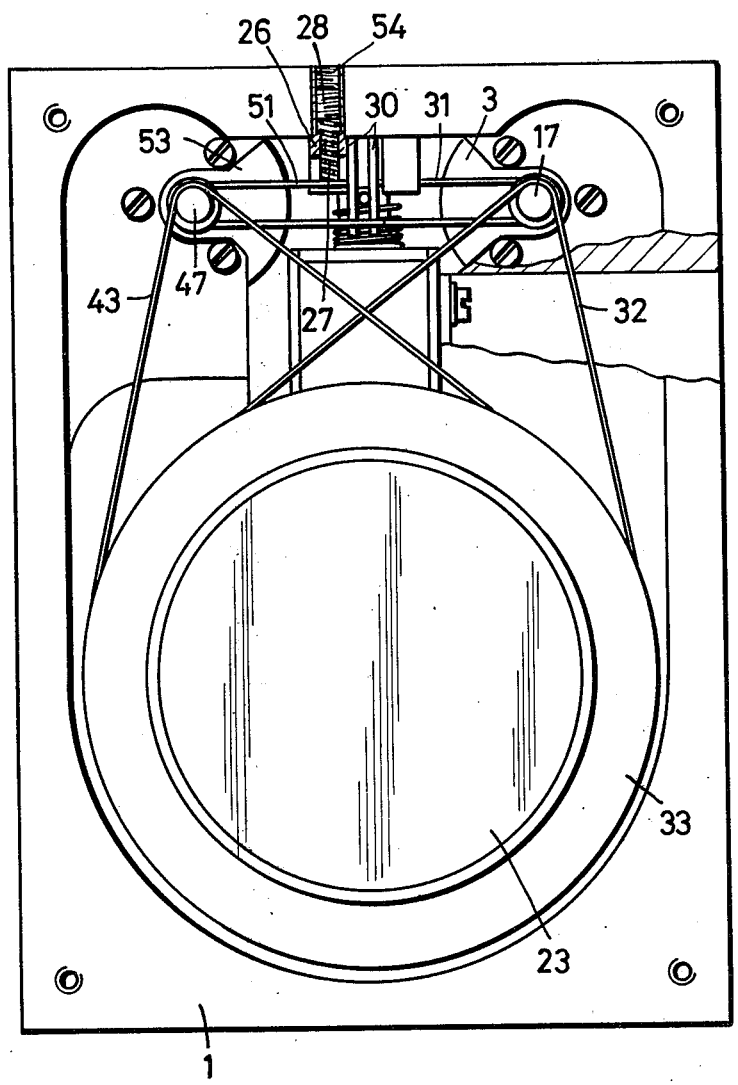
FIG. 2 shows the same tape drive mechanism in partly sectioned top-plan view.

FIGS. 1 and 2 show that two hubs, 21, 23 are rotatably mounted in coaxial arrangement on a base plate 1. The hub 21 is mounted rotatably on a shaft 8 by means of antifriction bearings 41, 42 and on its periphery it is provided with a toothed rim 33 for cooperation with a toothed belt 43 (FIG. 2). Hub 23 is mounted fixedly on the shaft 8 by means of a retaining member 24 which is tightly screwed to the shaft 8 by a countersunk screw 25. The shaft 8 is rotatably journalled in a sleeve 5 by means of antifriction bearings 10, 44. Sleeve 5 is screwed to base plate 1, screws 11, for example serving this purpose. A gear 45, driven by a second toothed belt 32, is mounted fixedly on the shaft 8 for rotation therewith. A pinion gear 17 is arranged on the shaft 3' of the motor 3 for rotation therewith; it drives the toothed belt 32.

An electro-magnet 4 is affixed in a cut-out of the base plate 1. An armature 14 of the electro-magnet bears an actuating pin 13 which extends transversely to the longitudinal axis of the electro-magnet 4. In the non-energized state of the electro-magnet 4, a compression spring 12 urges the armature 14 against an adjustable stop 16 threaded into base plate 1.

FIG. 2 shows the base plate 1 and the hub 23 in cooperation with the toothed belt 32; the pinion gear 17 on the shaft of motor 3 engages belt 32 which drives hub 23. The tape storage reel (not shown) is mounted on the hub 21, and the tape take-up reel on the hub 23. In the case of normal tape travel for recording or playback, the direction of rotation of both reels is counterclockwise. The motor 3 then exerts a predetermined restraining force to maintain a predetermined tape tension.

The motor 3 and a similar motor 53 are arranged at both lateral sides of the electro-magnet 4, equi-spaced from the same. Two parallel guide pins 30 on both sides of the actuating pin 13 serve to secure the magnet armature 14 in non-rotatable manner. The drive shaft of each electro-motor 3, 53 is surrounded by a thin hairpin spring 31, 51; one extremity of each spring 31, 51 is mounted within respective bearing blocks 26 (FIG. 2). For this purpose, each bearing block 26 is slit to receive and restrain one spring extremity. The slit is closed on the front side. To compensate for manufacturing inaccuracies during the production of the springs, each bearing block 26 is mounted in a longitudinally displaceable manner in a borehole 54 of base plate 1 and can be secured in selected positions. Within a suitable bore each bearing block 26 receives a compression spring 27 which bears with one end against the restrained extremity of the respective springs 31, 51 and, with its other end, against an adjustable stop 28. The free extremities of the springs 31, 51 extend approximately parallel to their restrained extremities in different planes with respect to one another; their length is such that they can cooperate with the actuating pin 13.

The mode of action of the arrangement will now be described.

When operating the tape machine in all types of operations such as, for example, at fast forward, fast rewind, or normal forward speed, the electro-magnet 4 is continuously energized. The armature 14 thereby is drawn into the magnet 4 in opposition to the force exerted by the spring 12 and the actuating pin 13 comes in contact with the free extremities of the two springs 31, 51 as it moves in the direction toward magnet 4. This causes both coils of the springs 31, 51 to open up slightly so that the pinions 17, 47 of the motors 3, 53 can rotate freely in both directions of rotation, unaffected by the springs. The motor, operating in each case in the wind-up sense, is electrically regulated to the number of revolutions required to obtain the tape tension necessary for a faultless operation, due to the restraining moment of the motor.

When the tape machine is shut down, either by switching off the power supply or due to a power interruption, the magnet 4 becomes deenergized and the armature 14 together with the actuating pin 13 returns to the initial rest position. The two free extremities of hairpin springs 31, 51 can now adjust themselves freely and the coils of the springs 31, 51 can engage the drive shafts 3', 53' or other appropriate elements or motors 3, 53. The springs 31, 51 apply different resistances to the rotation of the motor shafts, depending on the direction of rotation: when the hub 23 with a reel mounted on it attempts to rotate in the take-up direction, for example due to its inertia under the influence of position changes resulting from transporting of the tape machine, then an angular momentum in a counterclockwise direction is imparted to the drive shaft of the motor 3 via the drive belt 32. No significant resistance is exerted by the spring 31 to a counterclockwise rotation. The magnetic tape therefore becomes taut. However, if the angular moment is in a clockwise sense, that is to say in the sense of a decrease in the tape tension, this will effect a rotation of the pinion 17 and of the drive shaft of motor 3, also in a clockwise direction. The coil of the spring 31 now wraps itself tightly around the drive shaft and brings about an effective braking of the rotation.

In similar manner, the pinion 47 of motor 53 is connected with the hub 21 of the tape storage reel via belt 43. The spring 51 exerts an increased resistance against a counterclockwise rotation of the pinion 47, in that the coil of the spring 51 wraps itself around the drive shaft of the motor 53. In the opposite direction, however, the rotation can take place without any significant resistance. Thus, the magnet tape is always influenced in a sense causing it to become taut between the two reels, whereby the formation of slack tape loops is prevented since both the storage and the take-up reel can each only turn in the sense of tape take-up.

Manual interventions in the travelling path of the tape or particularly severe shocks during machine transport might lead to an overstretching of the magnetic tape and consequently cause it to break. To prevent this the braking power of the springs 31, 51 is limited to a predetermined value. For this purpose, the restrained extremities of these springs can move within the slits of the bearing block 26 in opposition to the pressure of the spring 27, when the springs 31, 51 are overstressed in a braking direction. By means of the threaded pin 28 in the bore 54, the braking moment can be adjusted by changing the initial spring tension. If, when a load is applied, the coil of spring 51 is drawn closed, then, in the case of a greater tension on the tape than is permissible, the restrained extremity of the spring 51 can withdraw in opposition to the pressure of the spring 27, until the free end of the spring 51 abuts against the actuating pin 13 and therewith limits the maximum moment. The same applies to the spring 31.

What is claimed is:

1. A tape transport mechanism comprising in combination:
   a frame,
   a pair of coaxially arranged hubs disposed on said frame, and adapted, respectively, to carry a tape supply reel and a tape take-up reel between which the tape is transportable under tension,
   electrically operable drive means comprising a pair of motors for selectively rotating said hubs in first and second opposite directions, each motor having a shaft in driving connection with a respective hub,
   a plurality of supports disposed on said frame,
   braking means including a plurality of hairpin springs in contact with, and surrounding a respective shaft, and yieldably resilient means urging said hairpin springs to act on the respective shaft to constrain the same against relative turning of the corresponding hub drivingly connected thereto, in a sense allowing the tape to slacken, each hairpin spring having a free extremity and an extremity restrained by a respective support, and
   operating means including an electromagnet having a movable armature, said movable armature having a portion engageable with said free extremities so as to release said hairpin springs from contact with the respective shaft, and to terminate the action of said braking means.

2. A mechanism as in claim 1, said drive means being connectable to a source of electrical energy together with said electro-magnet.

* * * * *